(12) United States Patent
Qin et al.

(10) Patent No.: US 11,551,114 B2
(45) Date of Patent: Jan. 10, 2023

(54) METHOD AND APPARATUS FOR RECOMMENDING TEST QUESTION, AND INTELLIGENT DEVICE

(71) Applicant: Baidu Online Network Technology (Beijing) Co., Ltd., Beijing (CN)

(72) Inventors: Chuan Qin, Beijing (CN); Hengshu Zhu, Beijing (CN); Chen Zhu, Beijing (CN); Chao Ma, Beijing (CN); Jingshuai Zhang, Beijing (CN); Peng Wang, Beijing (CN); Tong Xu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 495 days.

(21) Appl. No.: 16/711,793

(22) Filed: Dec. 12, 2019

(65) Prior Publication Data

US 2020/0394535 A1 Dec. 17, 2020

(30) Foreign Application Priority Data

Jun. 14, 2019 (CN) .......................... 201910518161.2

(51) Int. Cl.
*G06N 5/04* (2006.01)
*G06N 20/00* (2019.01)

(52) U.S. Cl.
CPC ............... *G06N 5/04* (2013.01); *G06N 20/00* (2019.01)

(58) Field of Classification Search
CPC .................................. G06N 5/04; G06N 20/00
USPC ............................................................ 706/12
See application file for complete search history.

(56) References Cited

U.S. PATENT DOCUMENTS

| | | | |
|---|---|---|---|
| 2017/0221165 A1* | 8/2017 | Sawant | G06Q 10/10 |
| 2017/0243312 A1* | 8/2017 | Smith | G06Q 50/2057 |
| 2019/0340945 A1* | 11/2019 | Malhotra | G06N 3/084 |
| 2020/0410452 A1* | 12/2020 | Halevy | G06Q 10/06398 |
| 2021/0056651 A1* | 2/2021 | Sengupta | G06Q 50/2057 |

FOREIGN PATENT DOCUMENTS

CN 108446886 A * 8/2018 .......... G06F 16/904

* cited by examiner

*Primary Examiner* — Ahmad F. Matar
*Assistant Examiner* — Jirapon Intavong
(74) *Attorney, Agent, or Firm* — Nixon Peabody LLP

(57) ABSTRACT

Embodiments of the present disclosure provide a method and apparatus for recommending a test question, and an intelligent device. The method includes: acquiring a plurality of skill entities of a post; calculating, according to the data of the post, a weight value of each of the plurality of skill entities; and acquiring, according to the weight value of each skill entity, a recommended test question of the post from a question bank.

14 Claims, 5 Drawing Sheets

METHOD AND APPARATUS FOR RECOMMENDING TEST QUESTION, AND INTELLIGENT DEVICE

CROSS-REFERENCE TO RELATED APPLICATIONS

This application claims priority to Chinese Patent Application No. 201910518161.2, filed on Jun. 14, 2019, titled "Method and apparatus for recommending test question, and intelligent device," which is hereby incorporated by reference in its entirety.

TECHNICAL FIELD

The present disclosure relates to the field of Internet technology, and specifically to a method and apparatus for recommending a test question, and an intelligent device.

BACKGROUND

Recruitment of talents is an important part of the development of enterprises. In many talent recruitment processes, interviewees are assessed by test questions, for example, by written test, or interviewers ask questions based on test questions on site. At present, many enterprises let their interviewers provide test questions, but the actual question setting efficiency of the interviewers is often low. Thus, the efficiency of providing test questions is relatively low.

SUMMARY

Embodiments of the present disclosure provide a method and apparatus for recommending a test question, and an intelligent device, so as to solve the problem that the efficiency of providing test questions is relatively low.

An embodiment of the present disclosure provides a method for recommending a test question, including: acquiring a plurality of skill entities of a post; calculating, according to data of the post, a weight value of each of the plurality of skill entities; and acquiring, according to the weight value of each skill entity, a recommended test question of the post from a question bank.

Optionally, the acquiring a plurality of skill entities of a post includes: extracting skill entities from recruitment data of the post through a skill entity depth model, wherein the skill entity depth model is an end-to-end model with recruitment data as an input, and skill entities as an output; and matching the extracted skill entities with skill entities in an entity relationship network to obtain a plurality of skill entities of the post in the entity relationship network, wherein the entity relationship network comprises at least one of: a subordinate relationship of skill entities, or an equivalent relationship of skill entities.

Optionally, the skill entity depth model is a depth model trained using historical recruitment data labeled with skill entities as training samples.

Optionally, the skill entities in the entity relationship network are skill entities obtained by noise reduction of a skill entity set corresponding to the skill entity depth model based on retrieval data.

Optionally, the skill entity set comprises labeled skill entities and unlabeled skill entities, and obtaining of the skill entities by noise reduction of the skill entity set corresponding to the skill entity depth model based on retrieval data comprises: constructing structural relationships among skill entities, click links and click pages, and calculating a similarity between the skill entities according to the click links and click pages corresponding to the skill entities; predicting, according to the similarity between the skill entities and the labeled skill entities, whether the unlabeled skill entities are valid skill entities, and removing invalid unlabeled skill entities to obtain noise-reduced skill entities.

Optionally, the relationships between the skill entities in the entity relationship network are skill entity relationships predicted by an entity relationship predicting model for multi-source heterogeneous data, wherein the entity relationship predicting model is a model obtained by training using labeled skill entity relationships.

Optionally, the data of the post comprises at least one of following items: post data, post promotion data, historical employee data, candidate resume data, or test question data.

In a second aspect, an embodiment of the present disclosure provides an apparatus for recommending a test question, including: an acquiring module, configured to acquire a plurality of skill entities of a post; a calculating module, configured to calculate, according to the data of the post, a weight value of each of the plurality of skill entities; and a selecting module, configured to acquire, according to the weight value of each skill entity, a recommended test question of the post from a question bank.

Optionally, the acquiring module includes: an extracting unit, configured to extract skill entities from recruitment data of the post through a skill entity depth model, wherein the skill entity depth model is an end-to-end model with recruitment data as an input, and skill entities as an output; and a matching unit, configured to match the extracted skill entities with skill entities in an entity relationship network to obtain a plurality of skill entities of the post in the entity relationship network, wherein the entity relationship network comprises at least one of: a subordinate relationship of skill entities, or an equivalent relationship of skill entities.

Optionally, the skill entity depth model is a depth model trained using historical recruitment data labeled with skill entities as training samples.

Optionally, the skill entities in the entity relationship network are skill entities obtained by noise reduction of a skill entity set corresponding to the skill entity depth model based on retrieval data.

Optionally, the skill entity set comprises labeled skill entities and unlabeled skill entities, and obtaining of the skill entities by noise reduction of the skill entity set corresponding to the skill entity depth model based on retrieval data comprises: constructing structural relationships among skill entities, click links and click pages, and calculating a similarity between the skill entities according to the click links and click pages corresponding to the skill entities; predicting, according to the similarity between the skill entities and the labeled skill entities, whether the unlabeled skill entities are valid skill entities, and removing the invalid unlabeled skill entities to obtain noise-reduced skill entities.

Optionally, the relationships between the skill entities in the entity relationship network are skill entity relationships predicted by an entity relationship predicting model for multi-source heterogeneous data, wherein the entity relationship predicting model is trained using labeled skill entity relationships.

Optionally, the data of the post comprises at least one of following items: post data, post promotion data, historical employee data, candidate resume data, or test question data.

In a third aspect, an embodiment of the present disclosure provides an intelligent device, including: a processor, a memory, and a computer program stored on the memory and executable on the processor, where the computer program, when executed by the processor, implements the operations of the method for recommending a test question according to the embodiments of the present disclosure.

In a fourth aspect, an embodiment of the present disclosure provides computer-readable storage medium, storing a computer program, where the computer program, when executed by a processor, implements the operations of the method for recommending a test question according to be embodiments of the present disclosure.

According to the embodiments of the present disclosure, a plurality of skill entities of a post are acquired; a weight value of each of the plurality of skill entities is calculated according to the data of the post; and a recommended test question for the post are acquired from a question bank according to the weight value of each skill entity. In this way, recommended test questions may be intelligently acquired, and the embodiments of the present disclosure may improve the efficiency of providing questions compared to the question setting by the interviewers.

BRIEF DESCRIPTION OF THE DRAWINGS

In order to more clearly illustrate the technical solutions of embodiments of the present disclosure, the drawings used in the description of embodiments of the present disclosure will be briefly described below. Apparently, the drawings in the following description are merely some embodiments of the present disclosure, and those of ordinary skill in the art may obtain other drawings according to the drawings without any creative effort.

DETAILED DESCRIPTION OF EMBODIMENTS

The following clearly and completely describes the technical solutions in embodiments of the present disclosure with reference to the accompanying drawings in the embodiments of the present disclosure. Apparently, the described embodiments are some of, not all of the embodiments of the present disclosure. All other embodiments obtained by those of ordinary skill in the art based on the embodiments of the present disclosure without any creative effort shall fall within the protection scope of the present disclosure.

The term "include" and its variations in the description and claims of the present disclosure are intended to cover a non-exclusive inclusion, for example, a process, method, system, product or device including a series of steps or units is not necessarily limited to those steps or units listed, but may include other steps or units not explicitly listed or inherent to such a process, method, system, product or device. Furthermore, "and/or" used in the description and claims denotes at least one of the connected object, for example, "A and/or B" denote three cases of separate A, separate B, and A and B.

In the embodiments of the present disclosure, the term "exemplary" or "such as" or the like is used to represent an example, illustration, or interpretation. Any embodiment or design described as "exemplary" or "for example" in the embodiments of the present disclosure should not be construed as preferred or advantageous over other embodiments or designs. Exactly, the use of the term "exemplary" or "such as" or the like is intended to present relevant concepts specifically.

Figure 1:
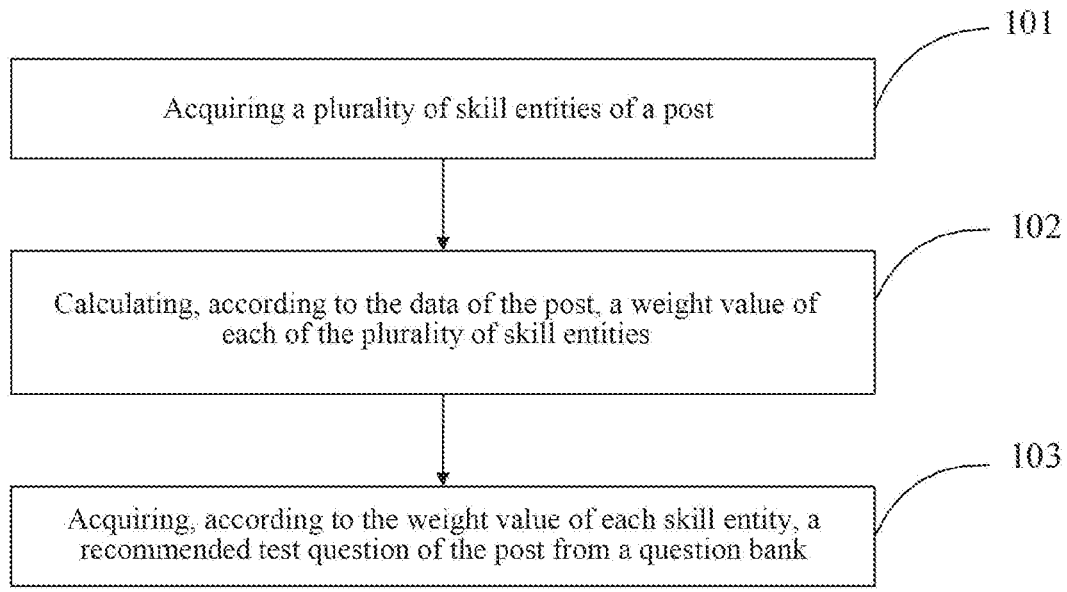
FIG. 1 is a flowchart of a method for recommending a test question according to an embodiment of the present disclosure.

Refer to FIG. 1, which is a flowchart of a method for recommending a test question according to an embodiment of the present disclosure. As shown in FIG. 1, the method includes the following steps.

Step 101: acquiring a plurality of skill entities of a post.

The plurality of skill entities of the post may be of the post currently recruited in an enterprise.

In addition, the plurality of skill entities may be extracted from relevant data of the post in step 101, for example, the plurality of skill entities are extracted from recruitment data of the post. Of course, in embodiments of the present disclosure, the plurality of skill entities of the post are not limited to be extracted from relevant data of the post, for example, may alternatively be extracted from work logs of employees or resigned employees of the post, or provided directly by the employees.

It should be noted that the skill entities in some embodiments of the present disclosure may be interpreted as skills that need to be used in the actual working process of the post. For example, for a "large-scale data mining engineer" post, "python" and "spark" are necessary skills for this post, so the skill entities of the post include "python" and "spark".

Step 102: calculating, according to data of the post, a weight value of each of the plurality of skill entities.

The data of the post may be data related to the post. In addition, the data may be multi-source data, and the weight values of the skill entities are calculated according to the multi-source data, so that the weight values of the skill entities are more accurate.

In an alternative implementation, the data of the post includes, but is not limited to, at least one of the following items: post data, post promotion data, historical employee data, candidate resume data, or test question data.

The post data may be post text information for describing basic information or demand information or the like of the post; the post promotion data may be data describing conditions, skills and the like for promotion of the post; the historical employee data may be resume data, skill data or actual work data, etc. of historical employees; the candidate resume data may be resume data of candidates applying for the post; the test question data may be test question data used in the historical recruitment process of the post, or test question data related to the post in the question bank.

Since the data of the post may include at least one of the above, personalized test question recommendation may be realized to improve the question test effect.

In addition, the calculating, according to the data of the post, a weight value of each of the plurality of skill entities may be calculating, according to the frequency of occurrence of each skill entity in the data, a weight value of the skill entity, and if the frequency of occurrence is higher, the weight value is larger, otherwise, the weight value is smaller. Alternatively, relevant information of a skill entity is searched in the data, and if the relevant information of the skill entity includes more key information (for example, importance, main skill, priority), the weight value of the skill entity is larger, otherwise, the weight value is smaller, so that main skill entities in the post may be determined through the key information. Alternatively, the weight value of a skill entity may be calculated according to the preceding order of occurrence of the skill entity in the data, the weight value of the previous skill entity is larger, and the weight value of the later skill entity is smaller, because some post data tends to describe the main skill entities at the forefront in the actual recruitment process.

Step 103: acquiring, according to the weight value of each skill entity, a recommended test question of the post from a question bank.

The question bank may be a local or remote question bank, and may include a large amount of test questions of skill entities.

The acquiring, according to the weight value of each skill entity, a recommended test question of the post from a question bank may be: selecting corresponding test questions from the question bank according to the weight values, where more test questions are extracted for the skill entity having the larger weight value, a few test questions are extracted for the skill entity having the smaller weight value, or in some cases of excessive test questions, the skill entity having the smallest weight value may be ignored.

Through the above steps, recommended test questions may be intelligently acquired, and the efficiency of providing test questions may be improved, compared to the test question setting by interviewers in the related art. In addition, recommended test questions matching the data of the post may be acquired, thereby realizing personalized recommendation to improve the assess effect of test questions.

It should be noted that the method may be applied to an intelligent device such as a mobile phone, a computer, a tablet computer, or a server.

According to the embodiment of the present disclosure, a plurality of skill entities of a post are acquired; a weight value of each of the plurality of skill entities is calculated according to the data of the post; and recommended test questions for the post are acquired from a question bank according to the weight value of each skill entity. In this way, recommended questions may be intelligently acquired, and the efficiency of providing test questions may be improved, compared to the test question setting by interviewers.

Figure 2:
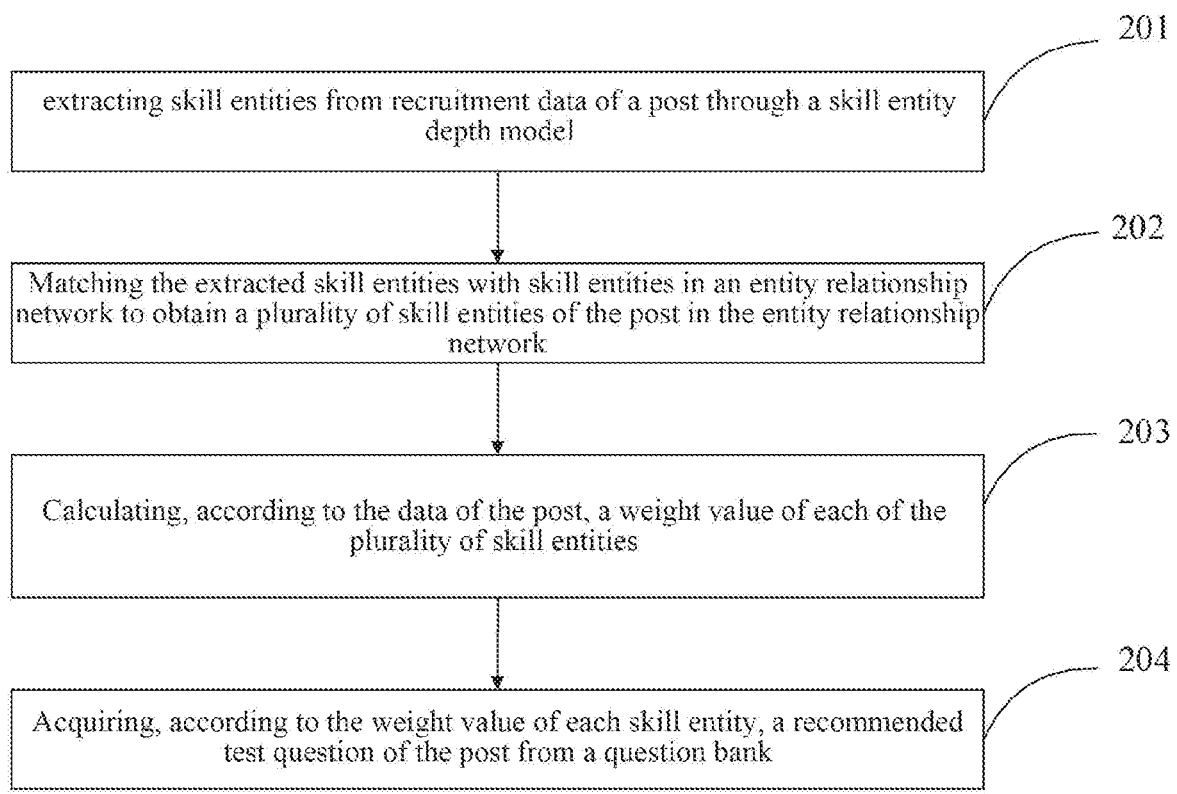
FIG. 2 is a flowchart of another method for recommending a test question according to an embodiment of the present disclosure.

Refer to FIG. 2, which is a flowchart of another method for recommending a test question according to an embodiment of the present disclosure. As shown in FIG. 2, the method includes the following steps.

Step 201: extracting skill entities from recruitment data of a post through a skill entity depth model, where the skill entity depth model is an end-to-end model with recruitment data as an input, and skill entities as an output.

The recruitment data of the post may include post data, resume data, test question data, and the like related to the recruitment of the post.

The skill entity depth model is an end-to-end model, by pre-training, with recruitment data as an input, and skill entities as an output.

As an alternative implementation, the skill entity depth model is a depth model obtained by training using historical recruitment data labeled with skill entities as training samples.

The historical recruitment data includes, but is not limited to post data, resume data, and test question data. The historical recruitment data may be labeled with corresponding skill entities manually or intelligently. Therefore, the end-to-end model with recruitment data as an input, and skill entities as an output may be accurately trained through the training samples.

Figure 3:
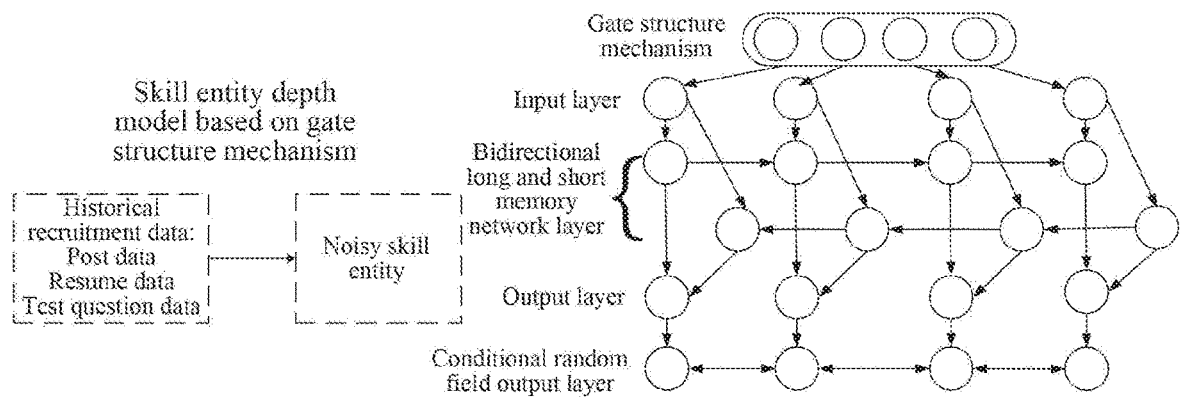
FIG. 3 is a schematic diagram of a skill entity depth model according to an embodiment of the present disclosure.

In addition, the skill entity depth model may be a model of a gate structure mechanism, for example, as shown in FIG. 3, including: a gate structure mechanism layer, an input layer, a bidirectional long and short memory network layer, an output layer, and a conditional random field output layer.

For example, in a skill entity predicting process, text information of character and word levels and text features such as Part of Speech (POS) and position may be converted via a gate structure mechanism to obtain a model input. Second, the input is modeled using bidirectional long and short term memory time recursive neural network (for example: BiLSTM network) to obtain hidden layer characterization. Finally, skill entities are predicted using a network structure layer based on a conditional random field.

Of course, the model shown in FIG. 3 is only an example. The structure of the skill entity depth model is not limited in the embodiment of the present disclosure. The skill entity depth model may be any one end-to-end model with recruitment data as an input, and skill entities as an output.

In step 201, the skill entities of the post may be accurately extracted from the recruitment data of the post through the skill entity depth model.

Step 202: matching the extracted skill entities with skill entities in an entity relationship network to obtain a plurality of skill entities of the post in the entity relationship network, where the entity relationship network includes at least one of a subordinate relationship and an equivalent relationship of skill entities.

The entity relationship network may be a pre-configured entity relationship network including relationships of a plurality of skill entities of a plurality of posts, and the relationships may be at least one of a subordinate relationship or an equivalent relationship. For example, the entity tensorflow is subordinate to the deep learning entity, the entity CNN is subordinate to the neural network entity, the entity CNN is equivalent to the convolutional neural network entity.

In the embodiment of the present disclosure, in order to further improve the test question recommendation efficiency and the assess effect, noise may be reduced, that is, the skill entities corresponding to the skill entity depth model may include noisy skill entities.

In an alternative implementation, the skill entities in the entity relationship network are skill entities obtained by noise reduction of a skill entity set corresponding to the skill entity depth model based on retrieval data.

The skill entity set corresponding to the skill entity depth model may be a skill entity set that may be output by the skill entity depth model, for example, output by the skill entity depth model during prediction for different posts and different data. The noise reduction may remove invalid skill entities, and the invalid skill entity here may be irrelevant or less relevant to the post.

Further, the skill entity set may include labeled skill entities and unlabeled skill entities, and obtaining of the skill entities by noise reduction of the skill entities corresponding to the skill entity depth model based on retrieval data includes: constructing structural relationships among skill entities, click links and click pages, and calculating a similarity between the skill entities according to the click links and click pages corresponding to the skill entities; predicting, according to the similarity between the skill entities and the labeled skill entities, whether the unlabeled skill entities are valid skill entities, and removing the invalid unlabeled skill entities to obtain noise-reduced skill entities.

The click links and the click pages may be click links and the click pages in the retrieval data, and the retrieval data may include retrieval contents, retrieval results, user click behaviors, dates, and the like. Further, the retrieval data may be anonymous retrieval data, so that user's personal information, retrieval location information and the like may be filtered out to improve information security.

Further, the click links may be the portions corresponding to Uniform Resource Locators (URLs) corresponding to the click pages, for example, domain names of the URLs, file paths, and the click pages may be clicked retrieval pages or retrieval pages after clicks.

Figure 4:
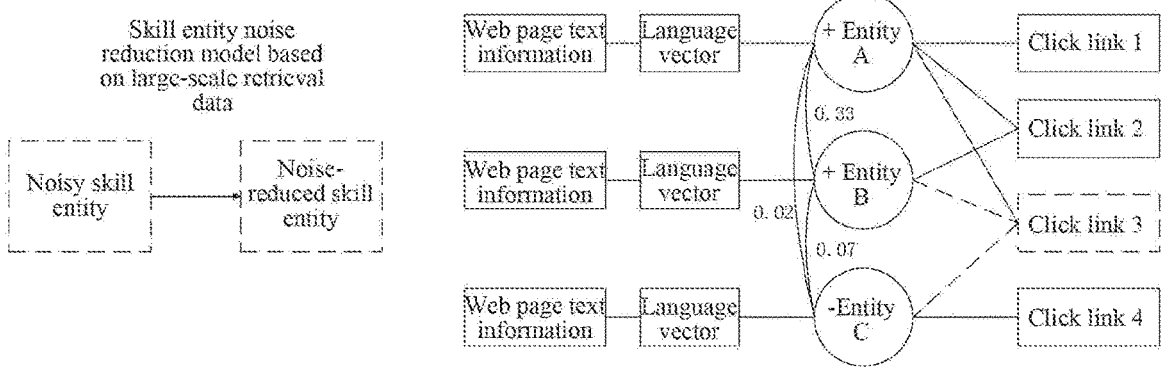
FIG. 4 is a schematic diagram of a skill entity relationship according to an embodiment of the present disclosure.

The constructing structural relationships among skill entities, click links and click pages may be: constructing structural relationships between click links and click pages during retrieval of the skill entities, and the structural relationships may represent the click links and the click pages during the retrieval of the skill entities. For example, as shown in FIG. 4, the circles in FIG. 4 represent skill entities, the right sides of the circles represent click links, and the lines between the skill entities and the click links represent relationships between the two. For example: if a keyword "Neural Network" is retried, and the link zh.wikipedia.org/zh-hans/%E4%BA%BA%E5%B7%A5%E7%A5%9E%E7%BB%8F%E7%BD%91%E7%BB%9C is clicked, the edge links a node neural network with zh.wikipedia.org/zh-hans/. The left sides of the circles in FIG. 4 represent click pages, for example, top K pages with click rate each skill entity, and language vectors extracted from these pages, where K is an integer greater than or equal to 1.

The calculating the similarity between the skill entities according to the click links and click pages corresponding to the skill entities may be: determining, for each skill entity, top K retrieval pages with click rate through the click link and click page corresponding to the skill entity, and constructing the top K retrieval pages with click rate into a language vector by using a word vector training method (for example: doc2vec). Then, the similarity between the vectors corresponding to every two skill entities is calculated using correlation metric analysis, e.g., cosine similarity. A preset threshold may be used, if the similarity is greater than the preset threshold, an edge relationship exists between the two skill entities, for example, edges between the skill entities as shown in FIG. 4. As shown in FIG. 4, the similarity between entity A and entity B is 0.33, the similarity between entity A and entity C is 0.02, and the similarity between entity B and entity C is 0.07, so it can be determined that entity A and entity B are valid entities and entity C is an invalid entity.

The predicting, according to the similarity between the skill entities and the labeled skill entities, whether the unlabeled skill entities are valid skill entities may be: predicting, according to the similarity between the skill entities and the labeled skill entities, whether unlabeled nodes in the network are entities by a label propagation algorithm, to obtain noise-reduced skill entities, where initial nodes used in the algorithm are the labeled skill entities, that is, noise-free skill entities. Further, the label propagation algorithm may a label propagation algorithm with the search logs, a set of candidate entities and a set of some labeled skill entities as inputs, and a probability whether each skill entity is a skill as an output. Specifically, the label propagation algorithm is not limited in the embodiment of the present disclosure.

Of course, in the embodiment of the present disclosure, the predicting, according to the similarity between the skill entities and the labeled skill entities, whether the unlabeled skill entities are valid skill entities is not limited to predicting by the label propagation algorithm, for example, may alternatively be: determining a similarity between each skill entity to be predicted and a corresponding labeled skill entity, and when the similarity is higher than a first threshold, determining that the corresponding skill entity is a valid skill entity; or when a plurality of labeled skill entities having similarity higher than a second threshold are determined, determining that the corresponding skill entities are valid skill entities, where the first threshold is greater than the second threshold; or when both the two conditions are not satisfied, determining that the corresponding skill entities are invalid skill entities.

By the above method, the invalid unlabeled skill entities may be removed effectively and accurately to obtain noise-reduction skill entities.

In addition, the noise reduction process may alternatively be implemented by a pre-trained model. As shown in FIG. 4, noise reduction is implemented on the skill entities by a skill entity noise reduction model based on large-scale retrieval data.

As an alternative implementation, the relationships between the skill entities in the entity relationship network are skill entity relationships predicted by an entity relationship predicting model for multi-source heterogeneous data, where the entity relationship predicting model is trained using labeled skill entity relationships.

The multi-source heterogeneous data may include historical recruitment data, retrieval data, encyclopedic data, and the like. In the predicting process, features for predicting entity relationships are extracted from the multi-source heterogeneous data, for example, from numbers of co-occurrence of entities in the recruitment data, relationships in entity texts occurring in the encyclopedic data, numbers of co-occurrence of skill entities in retrieval texts and retrieval pages, and then the entity relationships are predicted and extracted based on the extracted features to obtain relationships between the skill entities in the entity relationship network.

Figure 5:
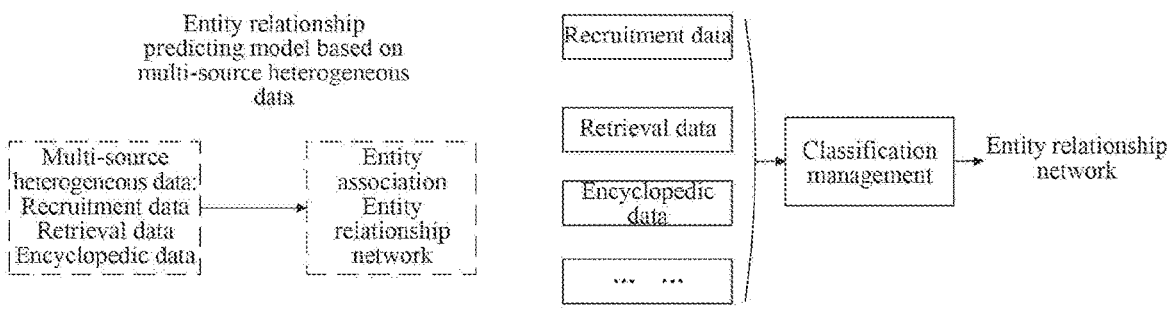
FIG. 5 is a schematic diagram of acquisition of an entity relationship network according to an embodiment of the present disclosure.

The relationships between the skill entities in the entity relationship network are relationships predicted by the entity relationship predicting model for multi-source heterogeneous data, thus the relationships between the skill entities are more accurate and cover a wider range. For example, as shown in FIG. 5, an entity relationship network may be obtained by an entity relationship predicting model based on multi-source heterogeneous data.

The entity relationship extraction model may be trained by constructing training data through labeled entity relationships, training using a classification model such as a Gradient Boosting Decision Tree (GBDT), and boosting the final accuracy of the model using an ensemble method.

It should be noted that, in the embodiment of the present disclosure, the training process of the entity relationship extraction model is not limited. In addition, the entity relationship extraction model may alternatively be pre-configured.

Moreover, in the process of constructing the entity relationship network using the trained relationships between the entities, a pruning strategy may also be designed, so that the relationship graph becomes a directed acyclic graph to improve the using effect of the entity relationship network.

Of course, in the embodiment of the present disclosure, the prediction of skill entity relationships relationship is not limited to be predicted by the entity relationship predicting model. For example, in some application scenarios, the entity relationship network may alternatively be configured by manual labeling.

In the embodiment of the present disclosure, the extracted skill entities may be matched with the skill entities in the entity relationship network to obtain a plurality of skill entities of the post in the entity relationship network in step 202, thereby improving the accuracy of recommending questions.

Step 203: calculating, according to the data of the post, a weight value of each of the plurality of skill entities.

Step 204: acquiring, according to the weight value of each skill entity, recommended test questions of the post from a question bank.

Figure 6:
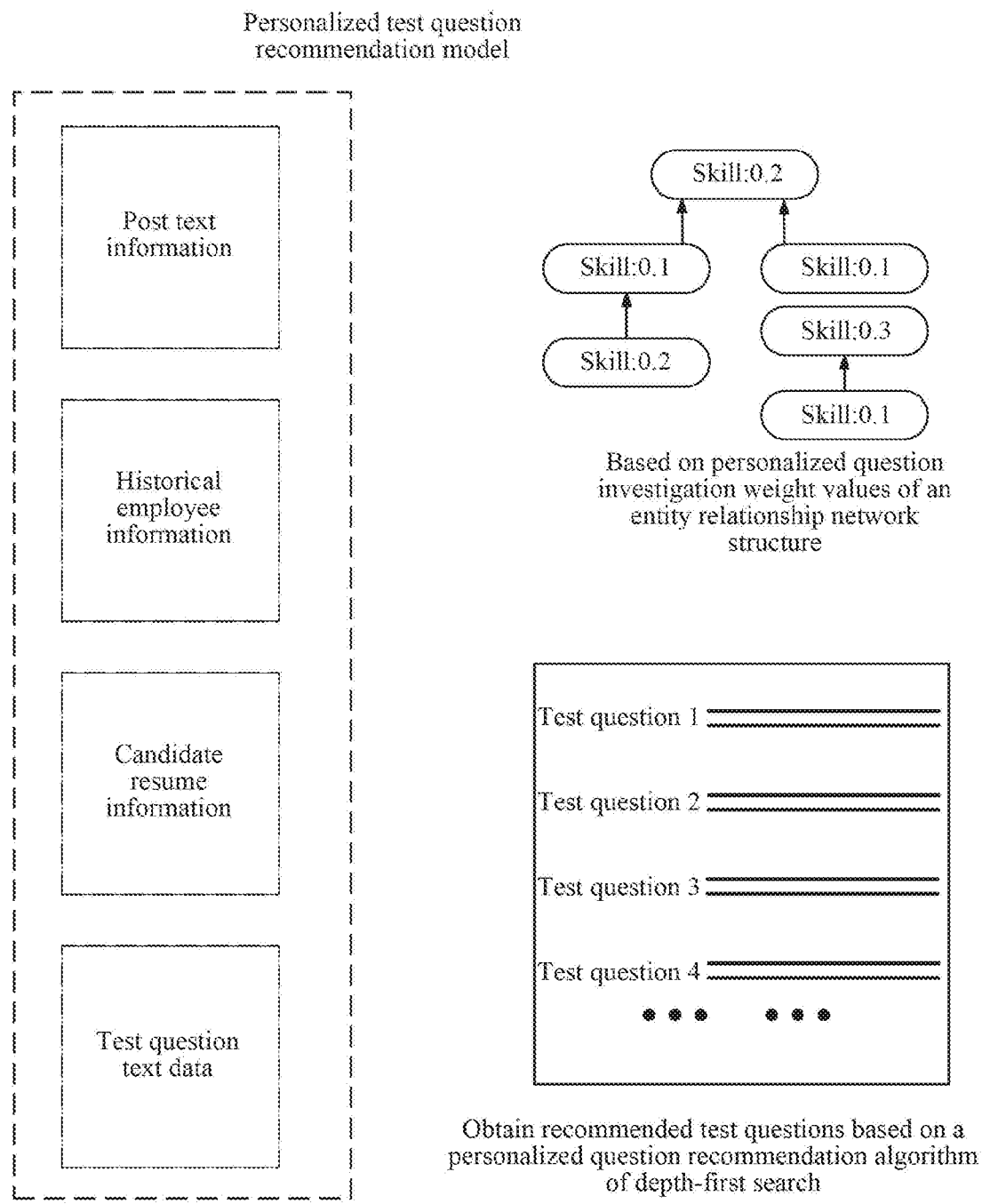
FIG. 6 is a schematic diagram of test question recommendation according to an embodiment of the present disclosure.

As an alternative implementation, step 203 of calculating weight values and step 204 of selecting recommended test questions of the post from the question bank may be implemented by a pre-configured depth-first search algorithm, for example, the input of the depth-first search algorithm may be skill entities of a post, data of the post, and a question bank, which may be a skill map, a post of duty, existing employee resumes, corresponding task performances, candidate resumes, and a question bank, and the output is recommended test questions. That is to say, the depth-first search algorithm may output recommended test questions according to the skill entities of the post, the data of the post, and the question bank. For example, as shown in FIG. 6, the recommended test questions are obtained based on post text information, historical employee data, candidate resume text data and test question texts, based on personalized question investigation weight values of an entity relationship network structure, and based on a personalized question recommendation algorithm of depth-first search.

Of course, in the embodiment of the present disclosure, step 203 and step 204 are not limited to be performed by the depth-first search algorithm, for example, the recommended test questions may be obtained by the method described in the embodiment of FIG. 1.

In the embodiment of the present disclosure, through the above steps, skill entities in a post, resumes, and test questions may be extracted using a skill entity depth model, and matched with an entity relationship network. Second, personalized test weights of different abilities are modeled using multi-source data of historical employee of the post, e.g., resume text data, promotion text data. Finally, personalized recommended test questions for written test of candidates are acquired.

The method for recommending a test question provided in the embodiment of the present disclosure may be used as a test question recommendation system under multi-source heterogeneous data, including multiple models introduced above. A skill entity relationship network is constructed using human resource data, large-scale search data, and other auxiliary data information to obtain the personalized test question recommendation system for written test. Moreover, the method for recommending a test question provided in the embodiment of the present disclosure may further obtain visual post ability demand analysis, candidate ability mastery analysis, and interpretable recommendation results based on question skill weights.

In the embodiment of the present disclosure, historical recruitment data may be modeled, so that the demand of the post for skills may be comprehensively mined, and finer skill focus of the post to be recruited may be learned. At the same time, personalized test questions may be recommended in combination with the post skill focus for the specialties of candidates, with higher accuracy.

The method for recommending a test question provided in the embodiment of the present disclosure may be constructed based on large-scale retrieval data and a deep learning model, which may greatly improve the efficiency of a recruitment flow.

The method for recommending a test question provided in the embodiment of the present disclosure may be based on an in-depth understanding of historical data to avoid some unfairness caused by artificial question setting.

In addition, the method for recommending a test question provided in the embodiment of the present disclosure may give detailed skill demands of the post, matching skills of candidates and the post, and skills tested by test questions, and therefore the method has good interpretability from the point of question setting.

Figure 7:
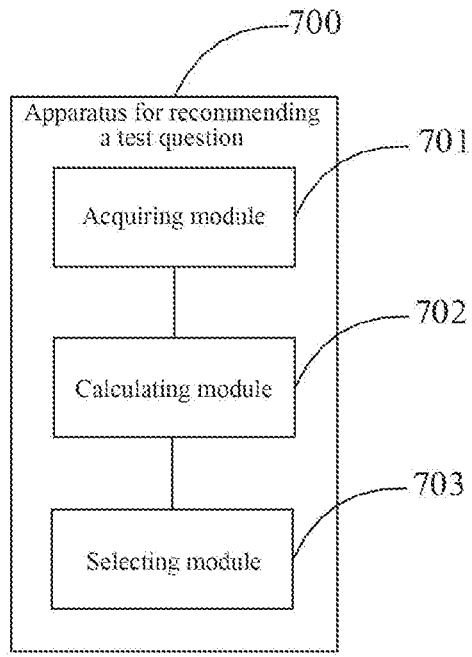
FIG. 7 is a structural diagram of an apparatus for recommending a test question according to an embodiment of the present disclosure.

Refer to FIG. 7, which is a structural diagram of a apparatus for recommending a test question according to an embodiment of the present disclosure. As shown in FIG. 7, the apparatus for recommending a test question 700 includes: an acquiring module 701, configured to acquire a plurality of skill entities of a post; a calculating module 702, configured to calculate, according to the data of the post, a weight value of each of the plurality of skill entities; and a selecting module 703, configured to acquire, according to the weight value of each skill entity, a recommended question of the post from a question bank.

Figure 8:
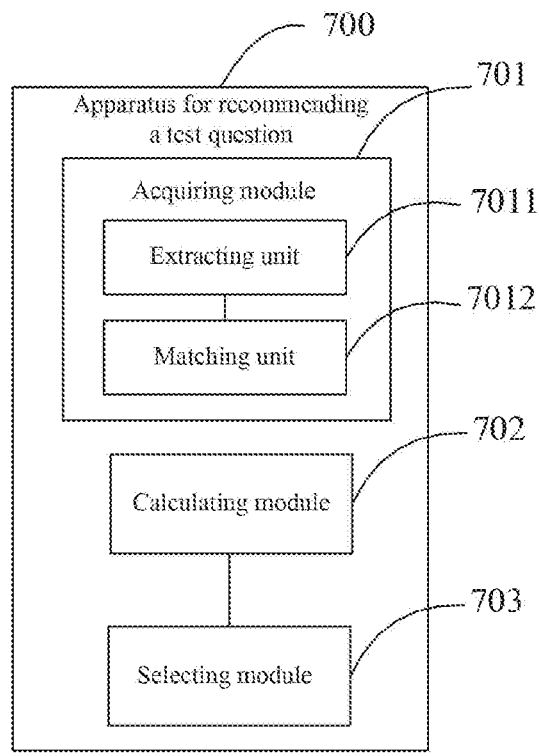
FIG. 8 is a structural diagram of another apparatus for recommending a test question according to an embodiment of the present disclosure.

Alternatively, as shown in FIG. 8, the acquiring module 701 includes: an extracting unit 7011, configured to extract skill entities from recruitment data of the post through a skill entity depth model, where the skill entity depth model is an end-to-end model with recruitment data as an input, and skill entities as an output; and a matching unit 7012, configured to match the extracted skill entities with skill entities in an entity relationship network to obtain a plurality of skill entities of the post in the entity relationship network, where the entity relationship network includes at least one of a subordinate relationship, or an equivalent relationship of skill entities.

Alternatively, the skill entity depth model is a depth model trained using historical recruitment data labeled with skill entities as training samples.

Alternatively, the skill entities in the entity relationship network are skill entities obtained by noise reduction of a skill entity set corresponding to the skill entity depth model based on retrieval data.

Alternatively, the skill entity set includes labeled skill entities and unlabeled skill entities, and obtaining of the skill entities by noise reduction of the skill entity set corresponding to the skill entity depth model based on retrieval data includes: constructing structural relationships among skill entities, click links and click pages, and calculating a similarity between the skill entities according to the click links and click pages corresponding to the skill entities; predicting, according to the similarity between the skill entities and the labeled skill entities, whether the unlabeled skill entities are valid skill entities, and removing the invalid unlabeled skill entities to obtain noise-reduced skill entities.

Alternatively, the relationships between the skill entities in the entity relationship network are skill entity relationships predicted by an entity relationship predicting model for multi-source heterogeneous data, where the entity relationship predicting model is trained using labeled skill entity relationships.

Alternatively, the data of the post includes at least one of the following items: post data, post promotion data, historical employee data, candidate resume data, or test question data.

It should be noted that any of the implementations in the embodiments of the present disclosure may be implemented by the apparatus for recommending a test question in the present embodiment, and the same beneficial effects may be achieved. Details are not described herein again.

Figure 9:
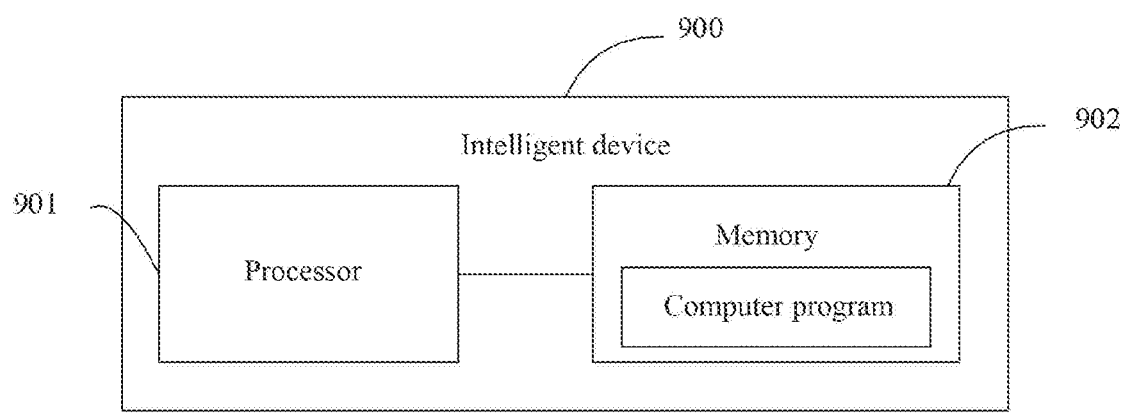
FIG. 9 is a structural diagram of an intelligent device according to an embodiment of the present disclosure.

Refer to FIG. 9, which is a structural diagram of an intelligent device according to an embodiment of the present disclosure. As shown in FIG. 9, the intelligent device 900 includes a processor 901, a memory 902, and a computer program stored on the memory 902 and capable of running on the processor.

The computer program, when executed by the processor 901, implements the following operations: acquiring a plurality of skill entities of a post; calculating, according to the data of the post, a weight value of each of the plurality of skill entities; and acquiring, according to the weight value of each skill entity, a recommended test question of the post from a question bank.

Alternatively, the acquiring, by the processor 901, a plurality of skill entities of a post, includes: extracting skill entities from recruitment data of the post through a skill entity depth model, where the skill entity depth model is an end-to-end model with recruitment data as an input, and skill entities as an output; and matching the extracted skill entities with skill entities in an entity relationship network to obtain a plurality of skill entities of the post in the entity relationship network, where the entity relationship network includes at least one of a subordinate relationship of skill entities, or an equivalent relationship of skill entities.

Alternatively, the skill entity depth model is a depth model trained using historical recruitment data labeled with skill entities as training samples.

Alternatively, the skill entities in the entity relationship network are skill entities obtained by noise reduction of a skill entity set corresponding to the skill entity depth model based on retrieval data.

Alternatively, the skill entity set includes labeled skill entities and unlabeled skill entities, and obtaining of the skill entities by noise reduction of the skill entity set corresponding to the skill entity depth model based on retrieval data includes: constructing structural relationships among skill entities, click links and click pages, and calculating a similarity between the skill entities according to the click links and click pages corresponding to the skill entities; predicting, according to the similarity between the skill entities and the labeled skill entities, whether the unlabeled skill entities are valid skill entities, and removing the invalid unlabeled skill entities to obtain noise-reduced skill entities.

Alternatively, the relationships between the skill entities in the entity relationship network are skill entity relationships predicted by an entity relationship predicting model for multi-source heterogeneous data, where the entity relationship predicting model is trained using labeled skill entity relationships.

Alternatively, the data of the post includes at least one of the following items: post data, post promotion data, historical employee data, candidate resume data, or test question data.

The intelligent device provided by the embodiment of the present disclosure may implement the various processes in the method embodiments shown in FIG. 1 and FIG. 2, and may achieve the same beneficial effects. To avoid repetition, details are not described herein again.

An embodiment of the present disclosure further provides a computer-readable storage medium, storing a computer program that, when executed by a processor, implements the operations of the method for recommending a test question provided by the embodiment of the present disclosure.

It should be noted that the terms "include", "comprise", or any variants thereof are intended to cover a non-exclusive inclusion. Accordingly, a process, method, article, or apparatus including a series of elements not only includes such elements, but also includes other elements not specifically listed, or may include inherent elements of the process, method, article, or apparatus. In the absence of more limitations, an element limited by "include a . . . " does not exclude other same elements existing in the process, method, article, or apparatus including the element.

Through the description of the above embodiments, those skilled in the art can clearly understand that the methods of the above embodiments can be implemented by means of software and a necessary universal hardware platform. Of course, the methods can also be implemented through hardware. However, in many cases, the former is better. Based on such an understanding, the technical solution of the present disclosure substantially, or the part of the present disclosure making contribution to the prior art may be embodied in the form of a software product, and the computer software product is stored in a storage medium (e.g., an ROM/RAM, a magnetic disk, an optical disk), which includes a plurality of instructions enabling a terminal (which may be a mobile phone, a computer, a server, or a network device, etc.) to execute the methods of the embodiments of the present disclosure.

The embodiments of the present disclosure are described above with reference to the drawings, but the present disclosure is not limited to the specific embodiments. The specific embodiments described above are merely illustrative but not restrictive. Many forms may also be made by those of ordinary skill in the art under the enlightenment of the present disclosure without departing from the purpose of the present disclosure and the scope of the claims, and these forms fall into the scope of the present disclosure.

What is claimed is:

1. A method for recommending a test question, comprising:

acquiring a plurality of skill entities of a post;

calculating, according to data of the post, a weight value of each of the plurality of skill entities; and acquiring, according to the weight value of each skill entity, a recommended test question of the post from a question bank;

wherein the acquiring a plurality of skill entities of a post comprises:

extracting skill entities from recruitment data of the post through a skill entity depth model, wherein the skill entity depth model is an end-to-end model with recruitment data as an input, and skill entities as an output; and matching the extracted skill entities with skill entities in an entity relationship network to obtain a plurality of skill entities of the post in the entity relationship network, wherein the entity relationship network comprises at least one of: a subordinate relationship of skill entities, or an equivalent relationship of skill entities.

2. The method according to claim 1, wherein the skill entity depth model is a depth model trained using historical recruitment data labeled with skill entities as training samples.

3. The method according to claim 1, wherein the skill entities in the entity relationship network are skill entities obtained by noise reduction of a skill entity set corresponding to the skill entity depth model based on retrieval data.

4. The method according to claim 3, wherein the skill entity set comprises labeled skill entities and unlabeled skill entities, and obtaining of the skill entities by noise reduction of the skill entity set corresponding to the skill entity depth model based on retrieval data comprises: constructing structural relationships among skill entities, click links and click pages, and calculating a similarity between the skill entities according to the click links and click pages corresponding to the skill entities; predicting, according to the similarity between the skill entities and the labeled skill entities, whether the unlabeled skill entities are valid skill entities, and removing invalid unlabeled skill entities to obtain noise-reduced skill entities.

5. The method according to claim 1, wherein the relationships between the skill entities in the entity relationship network are skill entity relationships predicted by an entity relationship predicting model for multi-source heterogeneous data, wherein the entity relationship predicting model is a model obtained by training using labeled skill entity relationships.

6. The method according to claim 1, wherein the data of the post comprises at least one of following items:
post data, post promotion data, historical employee data, candidate resume data, or test question data.

7. An intelligent device, comprising: a processor, a memory, and a computer program stored on the memory and executable on the processor, wherein the computer program, when executed by the processor, implements the operations of the method for recommending a test question according to claim 1.

8. A non-transitory computer-readable storage medium, storing a computer program, wherein the computer program, when executed by a processor, implements the operations of the method for recommending a test question according to claim 1.

9. An apparatus for recommending a test question, comprising:
at least one processor; and
a memory storing instructions, wherein the instructions when executed by the at least one processor, cause the at least one processor to perform operations, the operations comprising:
acquiring a plurality of skill entities of a post;
calculating, according to the data of the post, a weight value of each of the plurality of skill entities; and
acquiring, according to the weight value of each skill entity, a recommended test question of the post from a question bank;
wherein the acquiring a plurality of skill entities of a post comprises:
extracting skill entities from recruitment data of the post through a skill entity depth model, wherein the skill entity depth model is an end-to-end model with recruitment data as an input, and skill entities as an output; and
matching the extracted skill entities with skill entities in an entity relationship network to obtain a plurality of skill entities of the post in the entity relationship network, wherein the entity relationship network comprises at least one of: a subordinate relationship of skill entities, or an equivalent relationship of skill entities.

10. The apparatus according to claim 9, wherein the skill entity depth model is a depth model trained using historical recruitment data labeled with skill entities as training samples.

11. The apparatus according to claim 9, wherein the skill entities in the entity relationship network are skill entities obtained by noise reduction of a skill entity set corresponding to the skill entity depth model based on retrieval data.

12. The apparatus according to claim 11, wherein the skill entity set comprises labeled skill entities and unlabeled skill entities, and obtaining of the skill entities by noise reduction of the skill entity set corresponding to the skill entity depth model based on retrieval data comprises: constructing structural relationships among skill entities, click links and click pages, and calculating a similarity between the skill entities according to the click links and click pages corresponding to the skill entities; predicting, according to the similarity between the skill entities and the labeled skill entities, whether the unlabeled skill entities are valid skill entities, and removing the invalid unlabeled skill entities to obtain noise-reduced skill entities.

13. The apparatus according to claim 9, wherein the relationships between the skill entities in the entity relationship network are skill entity relationships predicted by an entity relationship predicting model for multi-source heterogeneous data, wherein the entity relationship predicting model is trained using labeled skill entity relationships.

14. The apparatus according to claim 9, wherein the data of the post comprises at least one of following items:
post data, post promotion data, historical employee data, candidate resume data, or test question data.

* * * * *